(12) United States Patent
Horiguchi et al.

(10) Patent No.: US 11,107,476 B2
(45) Date of Patent: Aug. 31, 2021

(54) SPEAKER ESTIMATION METHOD AND SPEAKER ESTIMATION DEVICE

(71) Applicant: HITACHI, LTD., Tokyo (JP)

(72) Inventors: Shota Horiguchi, Tokyo (JP); Naoyuki Kanda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 125 days.

(21) Appl. No.: 16/286,165

(22) Filed: Feb. 26, 2019

(65) Prior Publication Data
US 2019/0272828 A1 Sep. 5, 2019

(30) Foreign Application Priority Data
Mar. 2, 2018 (JP) .............................. JP2018-037316

(51) Int. Cl.
*G10L 17/00* (2013.01)
*G10L 17/06* (2013.01)
*G10L 17/02* (2013.01)
*G01S 3/80* (2006.01)

(52) U.S. Cl.
CPC ................ *G10L 17/00* (2013.01); *G01S 3/80* (2013.01); *G10L 17/02* (2013.01); *G10L 17/06* (2013.01)

(58) Field of Classification Search
None
See application file for complete search history.

(56) References Cited

U.S. PATENT DOCUMENTS

| | | | | |
|---|---|---|---|---|
| 6,707,489 B1* | 3/2004 | Maeng | ................ | G01S 3/7864 348/14.08 |
| 8,144,235 B2* | 3/2012 | Mori | ................... | H04N 5/2351 348/345 |
| 10,460,732 B2* | 10/2019 | Bhat | ....................... | G10L 25/57 |
| 2004/0225470 A1* | 11/2004 | Raykar | ..................... | G01S 5/18 702/150 |
| 2004/0267521 A1* | 12/2004 | Cutler | ..................... | G10L 25/78 704/202 |
| 2006/0115157 A1* | 6/2006 | Mori | .................. | G06K 9/00315 382/190 |
| 2006/0190809 A1* | 8/2006 | Hejna, Jr. | ............. | H04H 60/31 715/203 |
| 2009/0232318 A1* | 9/2009 | Ohta | .................... | H04R 29/001 381/56 |

(Continued)

FOREIGN PATENT DOCUMENTS

JP  2001-067098 A  3/2001
JP  2011-186351 A  9/2011

*Primary Examiner* — Thuykhanh Le
(74) *Attorney, Agent, or Firm* — Volpe Koenig

(57) ABSTRACT

A speaker estimation method that estimate the speaker from audio and image includes: inputting audio; extracting a feature quantity representing a voice characteristic from the input audio; inputting an image; detecting person regions of respective persons from the input image; estimating feature quantities representing voice characteristics from the respective detected person regions; Performing a change such that an image taken from another position and with another angle is input when any person is not detected; calculating a similarity between the feature quantity representing the voice characteristic extracted from the audio and the feature quantity representing the voice characteristic estimated from the person region in the image; and estimating a speaker from the calculated similarity.

10 Claims, 8 Drawing Sheets

(56) References Cited

U.S. PATENT DOCUMENTS

| | | | | |
|---|---|---|---|---|
| 2010/0085415 A1* | 4/2010 | Rahman | | G01S 3/80 |
| | | | | 348/14.08 |
| 2010/0149365 A1* | 6/2010 | Ishihara | | G06K 9/00221 |
| | | | | 348/222.1 |
| 2011/0224978 A1* | 9/2011 | Sawada | | G10L 15/32 |
| | | | | 704/231 |
| 2011/0273571 A1* | 11/2011 | Shimada | | G01S 3/7864 |
| | | | | 348/207.99 |
| 2012/0002056 A1* | 1/2012 | Nam | | G06T 3/40 |
| | | | | 348/169 |
| 2012/0020518 A1* | 1/2012 | Taguchi | | G06T 7/292 |
| | | | | 382/103 |
| 2012/0330659 A1* | 12/2012 | Nakadai | | G10L 21/06 |
| | | | | 704/235 |
| 2013/0151249 A1* | 6/2013 | Nakadai | | H04N 7/18 |
| | | | | 704/231 |
| 2013/0191127 A1* | 7/2013 | Iida | | G01S 3/8083 |
| | | | | 704/246 |
| 2014/0006026 A1* | 1/2014 | Lamb | | G10L 17/00 |
| | | | | 704/246 |
| 2014/0074471 A1* | 3/2014 | Sankar | | G10L 17/02 |
| | | | | 704/246 |
| 2014/0204716 A1* | 7/2014 | Kleijn | | G01S 5/18 |
| | | | | 367/127 |
| 2014/0214424 A1* | 7/2014 | Wang | | G10L 15/22 |
| | | | | 704/246 |
| 2015/0088513 A1* | 3/2015 | Lin | | G10L 17/22 |
| | | | | 704/246 |
| 2015/0106097 A1* | 4/2015 | Kim | | H04N 7/152 |
| | | | | 704/246 |
| 2015/0154957 A1* | 6/2015 | Nakadai | | G06F 40/58 |
| | | | | 704/235 |
| 2016/0005394 A1* | 1/2016 | Hiroe | | G10L 15/04 |
| | | | | 704/248 |
| 2016/0170710 A1* | 6/2016 | Kim | | G06F 3/013 |
| | | | | 704/275 |
| 2016/0203828 A1* | 7/2016 | Gomez | | G10L 15/20 |
| | | | | 704/226 |
| 2016/0379622 A1* | 12/2016 | Patel | | G10L 13/033 |
| | | | | 704/260 |
| 2017/0165840 A1* | 6/2017 | Lee | | G06K 9/00771 |
| 2018/0174600 A1* | 6/2018 | Chaudhuri | | H04N 21/4666 |
| 2018/0259613 A1* | 9/2018 | Hirata | | G01S 3/802 |
| 2019/0108834 A1* | 4/2019 | Nelson | | G10L 15/22 |

* cited by examiner

SPEAKER ESTIMATION METHOD AND SPEAKER ESTIMATION DEVICE

BACKGROUND

The present invention relates to a speaker estimation method and a speaker estimation device using the same.

In an interaction device such as an interaction robot, speaker estimation to detect who talks to the interaction device is important for realizing an appropriately answering function.

Conventionally, speaker estimation is performed mainly using audio such that a directional microphone and a microphone array, where a plurality of microphones are arranged, are used to estimate a direction of a sound source, thus detecting a speaker. However, when a plurality of persons exist in an identical direction, it is difficult to determine who the speaker is. To solve this problem, Japanese Unexamined Patent Application Publication Nos. 2001-67098 and 2011-186351 have disclosed related arts where not only the audio but also an image is used for the speaker estimation.

Japanese Unexamined Patent Application Publication No. 2001-67098 discloses a method where both speaker estimation using audio and detection using an image are performed and the result is aggregated. Japanese Unexamined Patent Application Publication No. 2011-186351 discloses a method for speaker estimation from an image applicable to any person using feature quantity extracted from images of mouth areas of persons during speech utterance.

SUMMARY

In Japanese Unexamined Patent Application Publication No. 2001-67098, the speaker estimation is performed by referring to audio and images of speakers preliminarily registered in a database. Therefore, a problem arises in that estimable speakers are limited to persons registered in the database.

In Japanese Unexamined Patent Application Publication No. 2011-186351, since the image during speaking is necessary to be obtained, a problem arises in that the audio and the image are necessary to be simultaneously obtained.

That is, for example, in a robot that performs interactions with an unspecified number of people in a public space, it is not realistic to limit the estimable speaker. The necessity of the image during speaking means a failure of the speaker estimation when spoken from a blind spot of an imaging device.

The present invention has been made in consideration of the above-described circumstances, and an object of the present invention is to provide a speaker estimation method and a speaker estimation device that performs speaker estimation to any person from audio and an image not necessarily taken during speaking.

The present invention considers the above-described related art and problems, and one example of the present invention includes a speaker estimation method that estimates a speaker from audio and image. The speaker estimation method includes: inputting audio; extracting a feature quantity representing a voice characteristic from the input audio; inputting an image; detecting person regions of respective persons from the input image; estimating feature quantities representing voice characteristics from the respective detected person regions; performing a change such that an image taken from another position and with another angle is input when any person is not detected; calculating a similarity between the feature quantity representing the voice characteristic extracted from the audio and the feature quantity representing the voice characteristic estimated from the person region in the image; and estimating a speaker from the calculated similarity.

The present invention can provide the speaker estimation method and the speaker estimation device configured to perform the speaker estimation to any person from the spoken audio and the image of the person not necessarily taken during speaking.

DETAILED DESCRIPTION

The following describes embodiments of the present invention in detail with reference to the drawings.

First Embodiment

Figure 1:
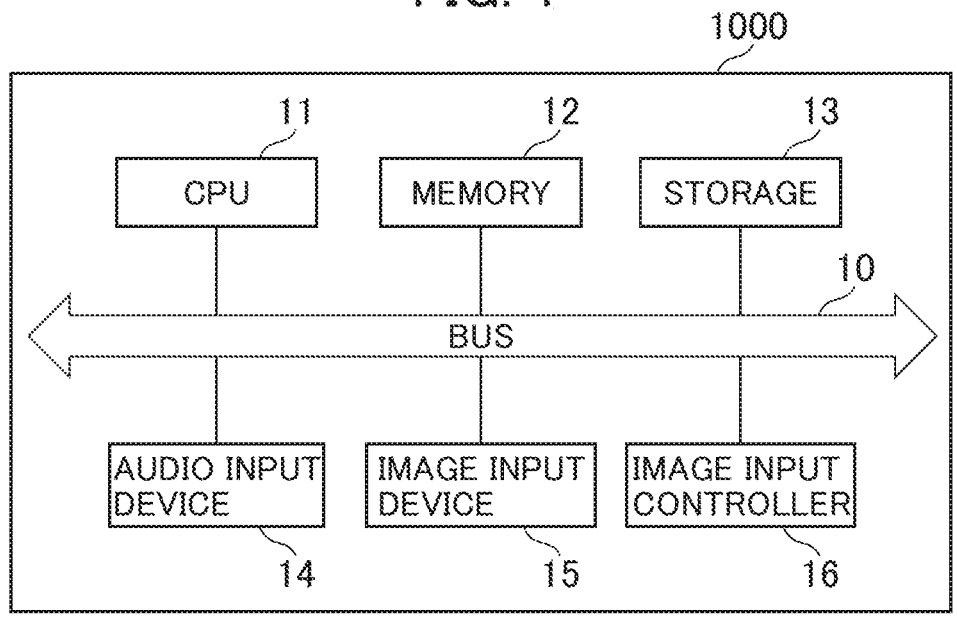
FIG. 1 is a hardware block diagram of a speaker estimation device in a first embodiment.

FIG. 1 is a hardware block diagram of a speaker estimation device 1000 in this embodiment. As illustrated in FIG. 1, the speaker estimation device 1000 includes a CPU 11, a memory 12, a storage 13 such as a hard disk drive, an audio input device 14 such as a microphone, an image input device 15 such as a camera, and an image input controller 16 that performs a control, for example, controlling a position and an angle of the image input device 15 to change a direction. All the components are mutually coupled via a bus 10 to mutually input and output data. The CPU 11 performs software processing that executes programs stored in the memory 12, thus controlling each component and performing various processing described later. The audio input device 14 may include a plurality of audio input units.

Figure 2:
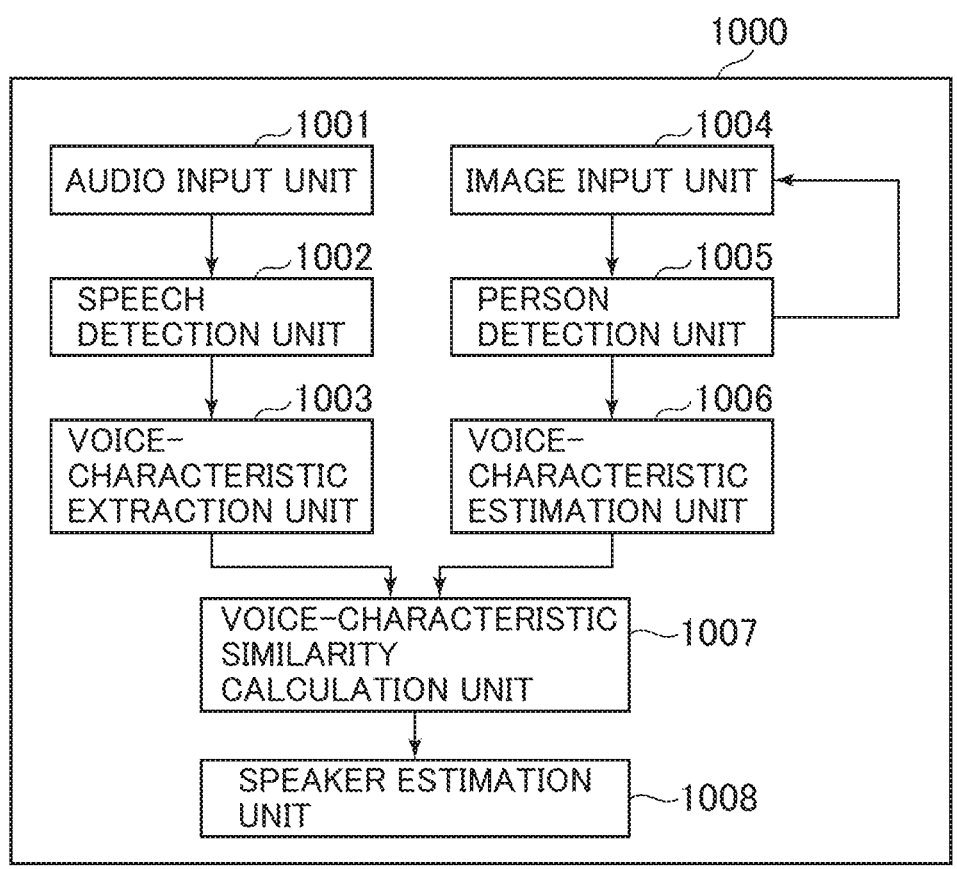
FIG. 2 is a process block diagram of the speaker estimation device in the first embodiment.

FIG. 2 is a process block diagram of the speaker estimation device 1000 in this embodiment. As illustrated in FIG. 2, the speaker estimation device 1000 includes an audio input unit 1001, a speech detection unit 1002, a voice characteristic extraction unit 1003, an image input unit 1004, a person detection unit 1005, a voice characteristic estimation unit 1006, a voice characteristic similarity calculation unit 1007, and a speaker estimation unit 1008. The speech detection unit 1002 detects a speech from audio input from the audio input unit 1001. The voice characteristic extraction unit 1003 extracts a voice characteristic from the speech detected by the speech detection unit 1002. The person detection unit 1005 detects person regions of respective persons from an image input from the image input unit 1004. The voice characteristic estimation unit 1006 estimates voice characteristics from the respective person regions detected by the person detection unit 1005. The voice characteristic similarity calculation unit 1007 calculates similarities between the voice characteristic extracted from the audio and the voice characteristics estimated from the respective person regions in the image. The speaker estimation unit 1008 determines a person who has the highest similarity of the voice characteristic calculated by the voice characteristic similarity calculation unit 1007 as a speaker.

Figure 3:
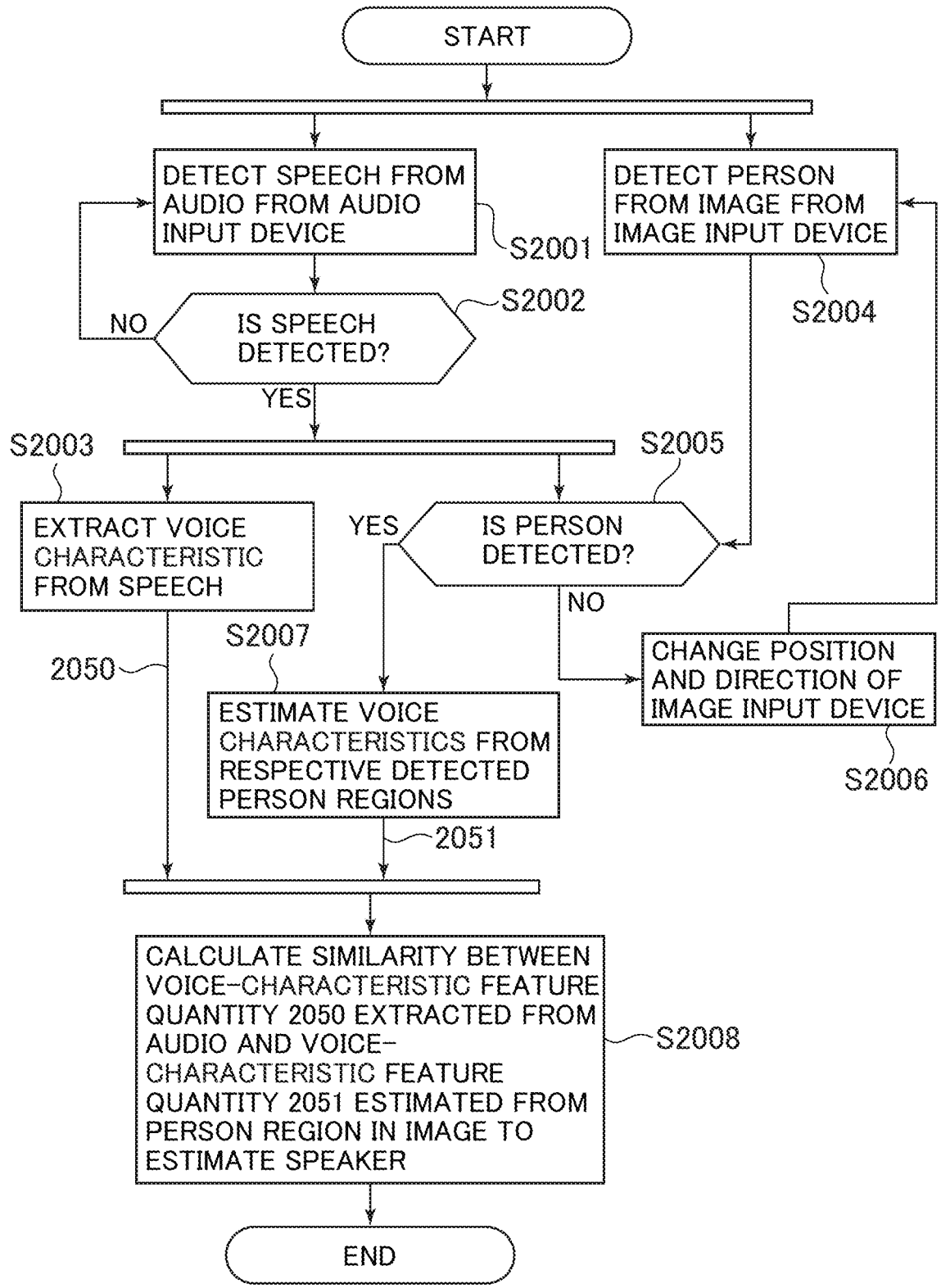
FIG. 3 is a process flowchart of the speaker estimation device in the first embodiment.

FIG. 3 is a process flowchart of the speaker estimation device 1000 in this embodiment. With reference to FIG. 2, an exemplary operation in the speaker estimation device 1000 will be described below.

In FIG. 3, in S2001, a speech is detected from audio input from the audio input unit 1001 and the speech detection unit 1002 via the audio input device 14. The speech detection from the audio can be performed with a method, for example, extracting a section where an audio power exceeds a certain threshold value. The speech detection from the audio is constantly performed while the audio is input from the audio input device.

In S2002, whether the speech is detected in S2001 is determined. When the speech is detected, the process proceeds to the following steps.

In S2003, when the speech is detected from the input audio, the voice characteristic extraction unit 1003 extracts a voice characteristic feature quantity 2050 representing the voice characteristic from the speech. As the voice characteristic feature quantity 2050, for example, a vector having a basic frequency or a formant frequency as an element, a GMM supervector, an HMM supervector, and an i-vector can be used, while not limiting to these vectors.

In S2004, the image input unit 1004 and the person detection unit 1005 detect persons from an image input via the image input device 15. The person detection from the image can be performed using, for example, a gradient histogram of the image. The person detection may be constantly performed during the operation of the speaker estimation device 1000, or may be started from a time point where the speech starts to be detected.

In S2005, when the speech is detected in S2002, whether the persons have been detected in the speech section is detected. In S2006, when any person is not detected in S2004 and S2005, the person detection processing is performed again with the image input device 15 whose position and direction are changed. For example, when the image input unit 1004 is a camera with a horizontal view angle α, the image input device 15 is rotated clockwise around a vertical line by α. This process ensures the speaker estimation device 1000 to find out the speaker even if the speaker exists in a blind spot of the image input device 15 during the speech. The number of times of the processing in S2006 may have an upper limit, and all the processing may be terminated when any person is not detected in a certain number of times of the processing. This prevents the processing from entering an endless loop, in the case where, for example, the speech is erroneously detected when there is no person around the speaker estimation device 1000.

In S2007, when the persons are detected, voice characteristic feature quantities 2051 representing the voice characteristics are estimated from the respective person regions of the persons detected by the voice characteristic estimation unit 1006 in FIG. 2. As the voice characteristic feature quantity 2051 to be estimated, the i-vector is used similarly to the voice characteristic feature quantity 2050. This voice characteristic feature quantity 2051 can use any vector, not limited to the i-vector, insofar as the vector is identical to the feature selected for the voice characteristic feature quantity 2050. The person region may include a full length, or may include a part of body, for example, only an upper half of the body or only a face area. A plurality of parts among them may be combined for use.

For making a voice characteristic estimator learn the voice characteristic estimation from the person image performed in S2007, a combination of the person's image and the voice characteristic feature quantity extracted from the person's audio is used. For collecting this data, people may be collected to record the audio. An existing lecture video and the like may be used to use person images detected from the video and voice characteristic feature quantities extracted from audio included in the video. With this method, a learning data set can be more easily established. With the prepared learning data set, the voice characteristic estimator can be established as follows, for example. First, a color histogram is extracted as feature quantity from a person image x. The method for extracting the color histogram from the image is publicly known, thus the detailed description is omitted here. Next, a regression model to estimate the feature quantity representing the voice characteristic from the color histogram is learned. For the learning of the regression model, for example, a support vector machine is usable. Note that, here, while the color histogram is used as the feature quantity extracted from the image, the feature quantity may be a gradient histogram, a SIFT feature quantity, and the like. While the support vector machine is used as the regression model, the regression model may be a neural network and similar method. The feature extraction and the regression may be simultaneously optimized using the neural network.

In S2008, the voice characteristic similarity calculation unit 1007 calculates similarities between the voice characteristic feature quantity 2050 extracted from the audio and the voice characteristic feature quantities 2051 estimated from the respective person regions in the image. Then, the speaker estimation unit 1008 estimates a person corresponding to the feature quantity having the highest similarity as the speaker. As the similarity, for example, an L2 norm can be used. Assume that the voice characteristic feature quantity extracted from the audio is v_audio, and the voice characteristic feature quantities of the respective persons estimated from the image are v^1_image, v^2_image, . . . and, v^N_image when the number of persons detected from the image is N. A similarity sim_i between the voice characteristic feature quantity extracted from the audio and the voice characteristic feature quantity estimated from the image of the i-th person is obtained from the following formula (1).

[Formula 1]

$$\text{sim}_i = |v_{audio} - v_{image}^i| \quad (1)$$

A scale of the similarity is not limited to the L2 norm, and a cosine similarity and the like may be used.

The similarity calculated in S2008 may have a threshold value, and in the case of the similarity below the threshold value, it may be determined that the speaker is not estimable. This prevents the person casually captured by the image input device from being determined as the speaker when the speech is erroneously detected.

Second Embodiment

Figure 4:
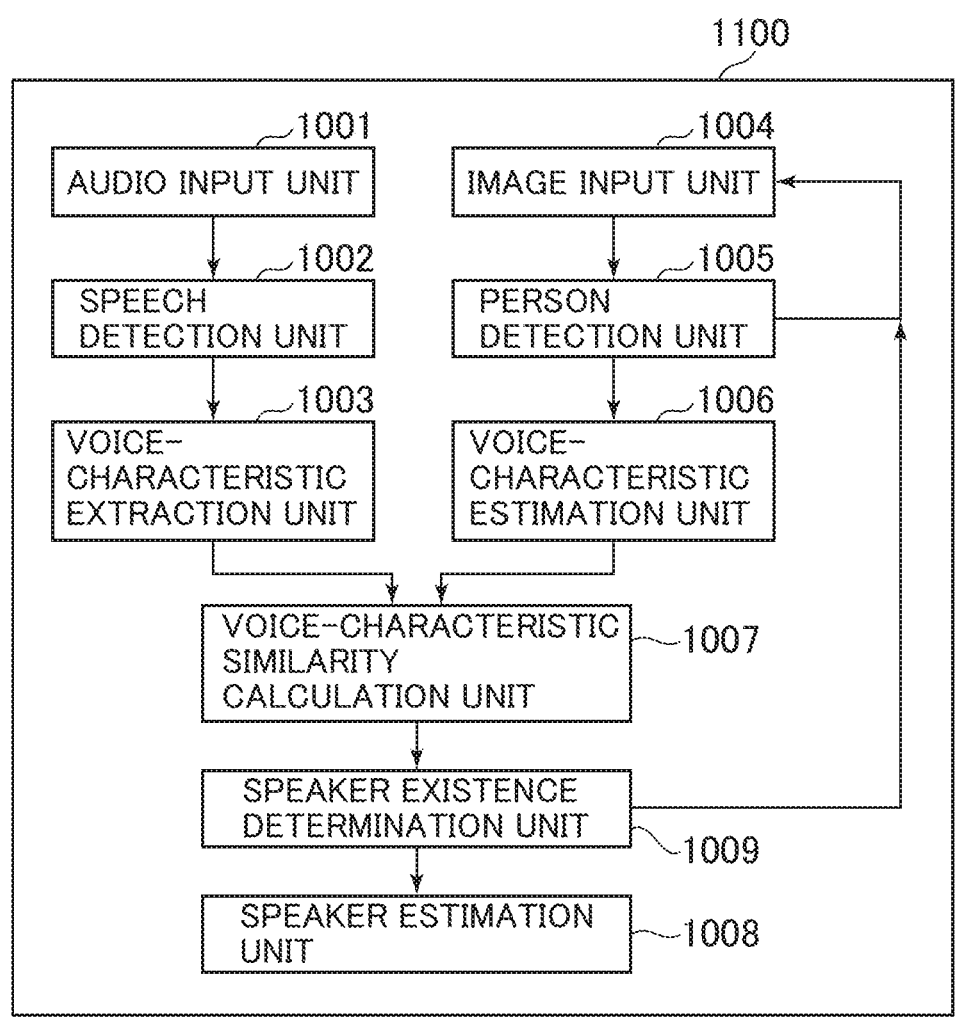
FIG. 4 is a process block diagram of a speaker estimation device in a second embodiment.

FIG. 4 is a process block diagram of a speaker estimation device 1100 in this embodiment. A hardware block diagram in this embodiment is identical to that of FIG. 1, thus being omitted. In FIG. 4, identical reference numerals are attached to functions similar to those in FIG. 2, and the descriptions are omitted. FIG. 4 is different from FIG. 2 in that a speaker existence determination unit 1009 is included. The speaker existence determination unit 1009 determines that there is no speaker when the similarity obtained by a voice characteristic similarity calculation unit 1107 is not equal to or more than a predetermined value. Details will be described with a process flowchart of FIG. 5.

Figure 5:
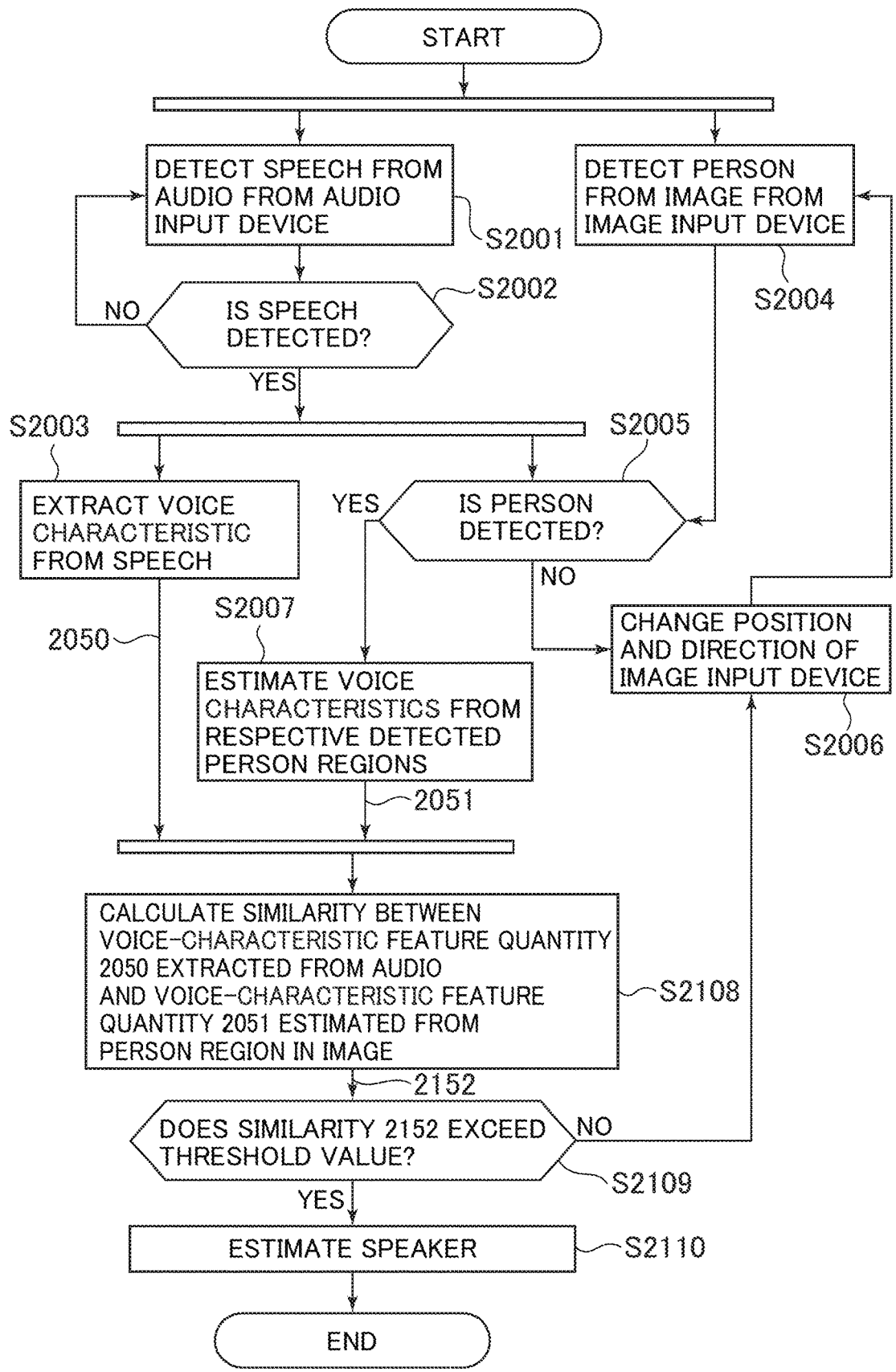
FIG. 5 is a process flowchart of the speaker estimation device in the second embodiment.

FIG. 5 is a process flowchart of the speaker estimation device 1100 in this embodiment. In FIG. 5, identical reference numerals are attached to functions similar to those in FIG. 3, and the descriptions are omitted. FIG. 5 is different from FIG. 3 in that while S2008 of FIG. 3 is the processing to calculate similarities between the voice characteristic feature quantity 2050 extracted from the audio and the voice characteristic feature quantities 2051 estimated from the respective person regions in the image to estimate the person corresponding to the feature quantity having the highest similarity as the speaker, S2108 of FIG. 5 is a process to perform the processing up to the similarity calculation in S2008. Then, in S2109, the speaker existence determination unit 1009 of FIG. 4 determines whether or not the maximum value of a similarity 2152 calculated in S2108 is greater than the predetermined threshold value. When the maximum value of the similarity 2152 is greater, the person corresponding to the similarity having the maximum value is estimated as the speaker in S2110, and the process terminates. When the maximum value of the similarity 2152 is smaller than the predetermined threshold value in S2109, the step of S2006 is performed again to re-detect persons. This prevents a determination of a non-speaker captured by the image input device as the speaker although the speaker actually exists in the blind spot of the image input device. This also prevents a determination of a person casually captured by the image input device as the speaker when the speech is erroneously detected.

The threshold value in S2109 may be decreased every time that S2109 is executed. This prevents the processing from entering an endless loop where the position and the direction of the image input device continue to be chanced to search the speaker even when the voice characteristic estimated from the image diverges from the actual voice characteristic.

Third Embodiment

Figure 6:
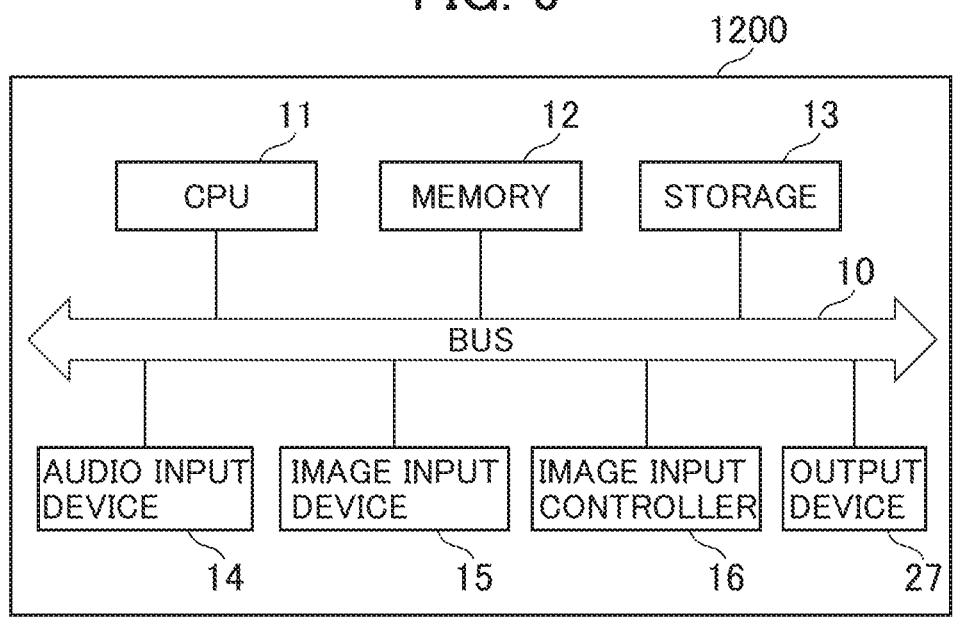
FIG. 6 is a hardware block diagram of a speaker estimation device in a third embodiment.

FIG. 6 is a hardware block diagram of a speaker estimation device 1200 in this embodiment. In FIG. 6, identical reference numerals are attached to functions similar to those in FIG. 1, and the descriptions are omitted. FIG. 6 is different from FIG. 1 in that an output device 27 is included. The output device 27 includes an audio output from a loudspeaker and the like, a behavior output from a robot to which the speaker estimation device 1200 is mounted, and similar output.

Figure 7:
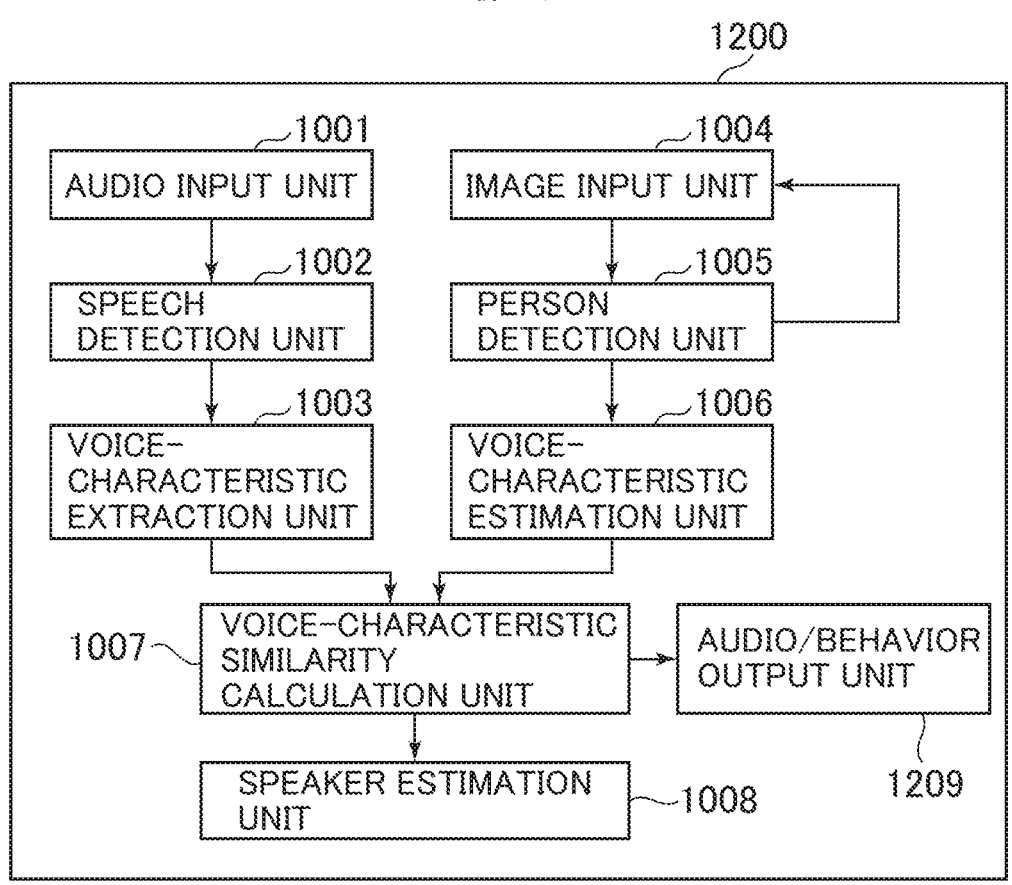
FIG. 7 is a process block diagram of the speaker estimation device in the third embodiment.

FIG. 7 is a process block diagram of the speaker estimation device 1200 in this embodiment. In FIG. 7, identical reference numerals are attached to functions similar to those in FIG. 2, and the descriptions are omitted. FIG. 7 is different from FIG. 2 in that an audio/behavior output unit 1209 is included. The audio/behavior output unit 1209 outputs audio and behaviors for speaker identification when the maximum value among the similarities calculated by a voice characteristic similarity calculation unit 1207 is smaller than the predetermined threshold value. Details will be described with a process flowchart of FIG. 8.

Figure 8:
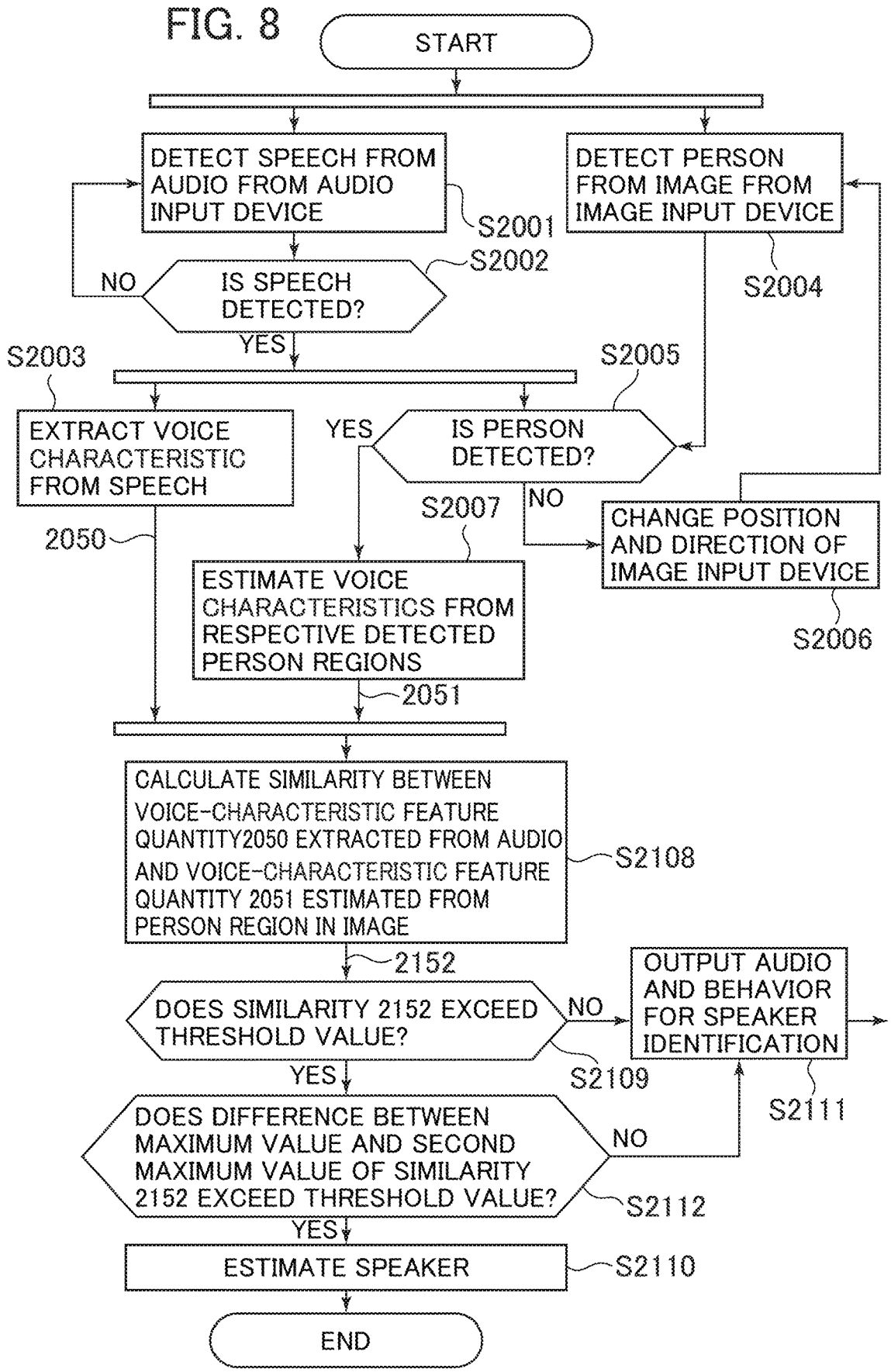
FIG. 8 is a process flowchart of the speaker estimation device in the third embodiment.

FIG. 8 is a process flowchart of the speaker estimation device 1200 in this embodiment. In FIG. 8, identical reference numerals are attached to functions similar to those in FIG. 5, and the descriptions are omitted. FIG. 8 is different from FIG. 5 in the process after S2109.

In FIG. 8, when the maximum value of the similarity 2152 calculated in S2108 is smaller than the predetermined threshold value in S2109, the audio/behavior output unit 1209 in FIG. 7 outputs the audio and the behaviors for the speaker identification in S2111. This ensures improvement of the accuracy of the speaker estimation by performing a check operation for obtaining sufficient confirmation when there is no sufficient assurance of the speaker identification. When the maximum value of the similarity 2152 is larger than the threshold value in S2109, the process proceeds to S2112. Insofar as it can be determined whether or not one or more candidate of the speaker exists in the image, the determination method is not limited to the comparison of the maximum value of the similarity 2152 with the threshold value.

When a difference between the maximum value and the second largest value of the similarity 2152 is smaller than the predetermined threshold value in S2112, the audio and the behaviors for the speaker identification are output in S2111. This ensures improvement of the accuracy of the speaker estimation by performing a check operation for obtaining sufficient confirmation when the candidate cannot be narrowed to one person with the speaker estimation result. Note that, assuming the case where the similarity 2152 has two or more values equal to or more than the predetermined threshold value, insofar it can be determined whether or not two or more candidates of the speaker exist in the image, the determination method is not limited to the comparison of the difference between the maximum value and the second largest value of the similarity 2152 with the threshold value. For example, the determination may be performed with the comparison of the second largest value of the similarity 2152 with the threshold value. Only one of S2109 and S2112 may be executed.

The output in S2111 may be an output of question audio, for example, "Do you need something?" to a person having the highest similarity. Depending on an answer to this question audio, it can be confirmed whether this person is the speaker. When the device is a robot, for example, a behavior to look around may be output to appeal to surrounding people that the robot has not identified the speaker. If it can extract the behavior of the speaker, for example, waving hands for appealing that the person is the speaker, the speaker can be identified.

After the output of the audio and the behavior for the speaker identification in S2111, the speaker estimation may be performed with S2001 and S2004 again, or the speaker estimation may be performed using the result of audio direction estimation and the like.

Fourth Embodiment

A hardware block diagram of a speaker estimation device 1300 in this embodiment is identical to the hardware block diagram in the first embodiment illustrated in FIG. 1, thus the descriptions are omitted. However, in this embodiment, it is necessary that the audio input device 14 includes a plurality of audio input devices.

Figure 9:
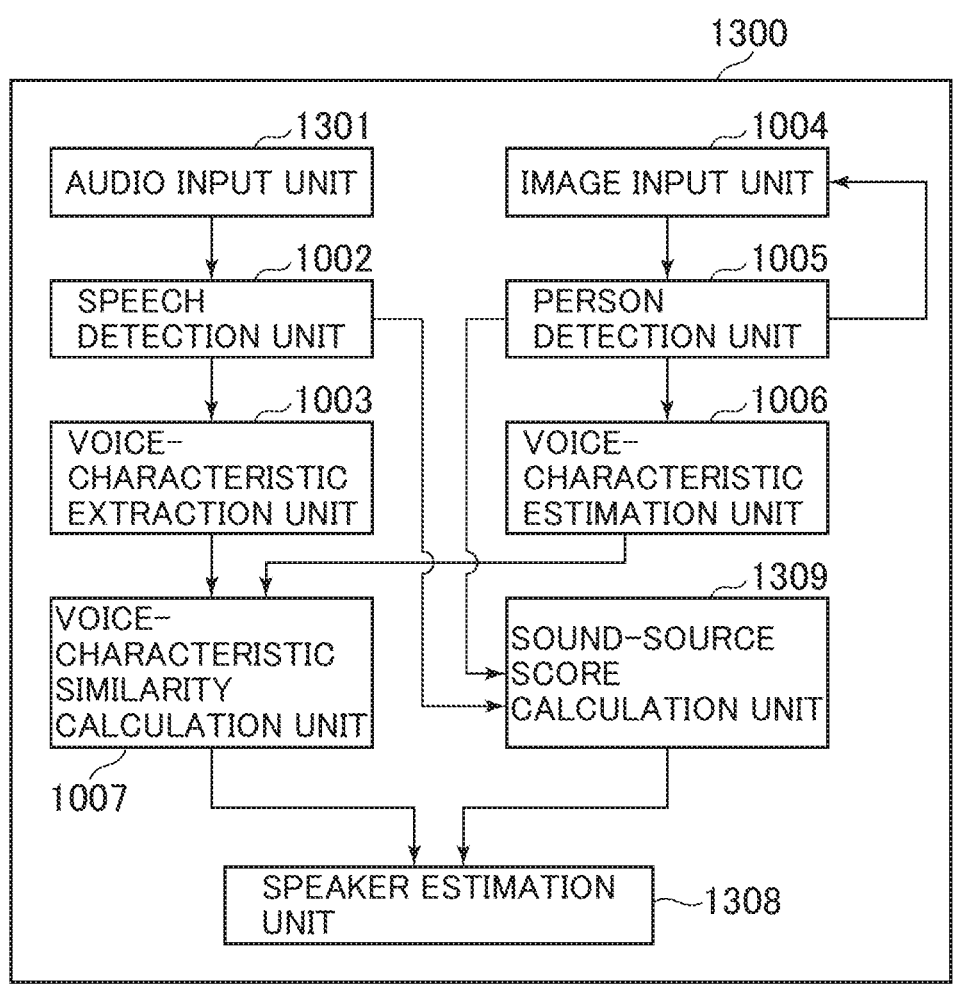
FIG. 9 is a process block diagram of a speaker estimation device in a fourth embodiment.

FIG. 9 is a process block diagram of the speaker estimation device 1300 in this embodiment. In FIG. 9, identical reference numerals are attached to functions similar to those in FIG. 2, and the descriptions are omitted. FIG. 9 is different from FIG. 2 in that: an audio input unit 1301 is a processing unit as the audio input device 14 including the plurality of audio input units; a sound-source score calculation unit 1309 is included; and a speaker estimation unit 1308 uses not only the result by the voice characteristic similarity calculation unit 1007 but also the result by the sound-source score calculation unit 1309. Details will be described with a process flowchart of FIG. 10.

Figure 10:
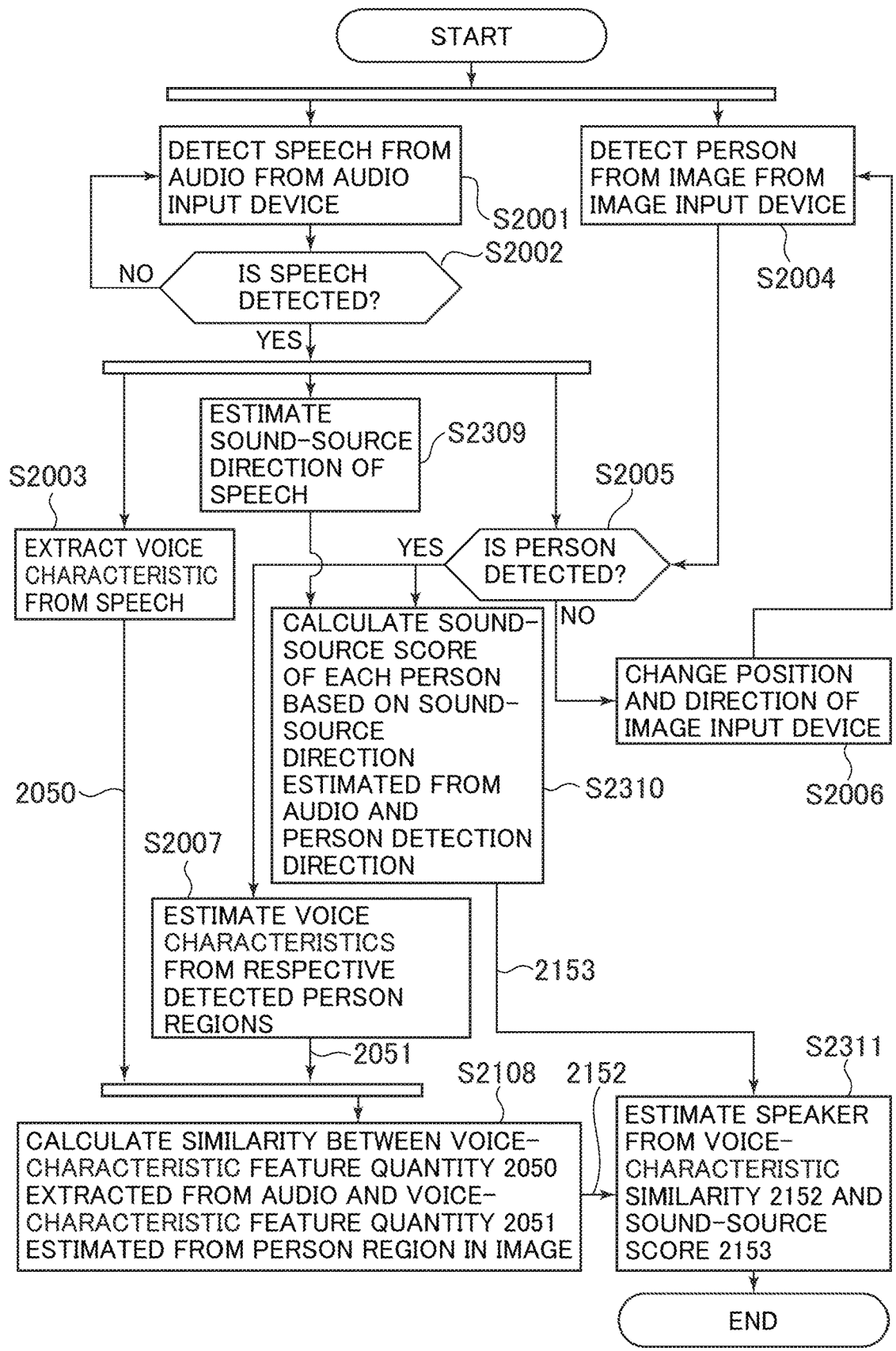
FIG. 10 is a process flowchart of the speaker estimation device in the fourth embodiment.

FIG. 10 is the process flowchart of the speaker estimation device 1300 in this embodiment. In FIG. 10, identical reference numerals are attached to functions similar to those in FIG. 5, and the descriptions are omitted. FIG. 10 is different from FIG. 5 in the process after S2108, and including S2309, S2310, and S2311. S2309 is a process for estimating a sound-source direction of the speech. S2310 is a process for calculating scores indicating degrees with which the sound-sources correspond to respective persons. S2311 is a process for estimating the speaker from the similarity of the voice characteristic feature quantity and the sound-source score. That is, the difference arises in that the speaker estimation unit 1308 uses not only the result by the voice characteristic similarity calculation unit but also the result by the sound-source score calculation unit.

In FIG. 10, in S2309, the sound-source direction of the speech is estimated from multi-channel audio input from the audio input unit 1301. The sound-source direction estimation from the audio can be performed using, for example, phase difference in observation signals for respective channels. While this process is performed by the sound-source score calculation unit 1309 in FIG. 9, this process may be divided to configure additional processing by a sound-source direction estimation unit.

In S2310, the sound-source score calculation unit 1309 in FIG. 9 uses the sound-source direction estimated in S2309 and the person detection result in S2005 to calculate sound-source scores 2153 as probability of the speaker for respective persons. The sound-source score 2153 indicates the degree with which the sound-source corresponds to each person. For the sound-source score 2153, for example, assuming that an estimated sound-source direction is a, and a direction of a detected person p is $b_p$, a sound-source score $s_p$ of the person p is obtained as a cosine similarity between a and $b_p$ from the following formula (2).

[Formula 2]

$$s_p = \frac{a \cdot b_p}{|a||b_p|} \quad (2)$$

This sound-source score is not limited to the cosine similarity. For example, an angle between a and $b_p$ may be directly used, not limiting to this.

In S2311, the speaker is estimated from the similarity r (2152) of the voice characteristic feature quantity calculated for each person in S2108 and the sound-source score s (2153) calculated for each person in S2310. This estimation can be performed, for example, with a weighted sum of r and s as the following formula (3).

[Formula 3]

$$p_{speaker} = \underset{p}{\mathrm{argmax}}(w_r r_p + w_s s_p) \quad (3)$$

Here, $r_p$ and $s_p$ are the similarity of the voice characteristic feature quantity and the sound-source score of the person p, respectively, $w_r$ and $w_s$ are weights to the similarity $r_p$ of the voice characteristic feature quantity and the sound-source score $s_p$, respectively, and $p_{speaker}$ is the estimated speaker.

Thus, according to this embodiment, the speaker estimation is performed by using not only the result of the similarity of the voice characteristic feature quantity but also information on the sound-source direction, thus providing an effect of ensuring the speaker estimation with higher accuracy.

While the embodiments have been described above, the present invention is not limited to the above-described embodiments but includes various modifications. For example, the above-described embodiments have been described in detail in order to easily describe the present invention, and therefore, it is not necessarily limited to include all the described configurations. It is possible to replace a part of the configuration of one embodiment with a configuration of the other embodiment, and it is possible to add a configuration of one embodiment to a configuration of the other embodiment. Some of the configurations of each embodiment can be added to, deleted from, or replaced by other configurations.

What is claimed is:

1. A speaker estimation method that estimates a speaker from audio and image, comprising:
   inputting audio;
   extracting a feature quantity comprising a first vector representing a voice characteristic from the input audio;
   inputting an image of respective persons, the image not taken during speaking by the respective persons;
   detecting person regions of the respective persons from the input image:
   estimating a feature quantity comprising a second vector representing a voice characteristic from the respective detected person regions;
   performing a change such that an image taken from another position and with another angle is input when any person is not detected;
   calculating a similarity between the feature quantity representing the voice characteristic extracted from the input audio and the feature quantity representing the voice characteristic estimated from the person region in the image by comparing at least an L2 norm between the first vector and the second vector; and
   estimating a speaker from the calculated similarity.

2. The speaker estimation method according to claim 1, comprising changing a position and an angle for inputting an image when the calculated similarity has a maximum value smaller than a threshold value.

3. The speaker estimation method according to claim 1, comprising outputting audio and a behavior for identifying the speaker when the calculated similarity has a maximum value smaller than a threshold value.

4. The speaker estimation method according to claim 3, comprising outputting the audio and the behavior for identifying the speaker when the calculated similarity has two or more values equal to or more than the threshold value.

5. The speaker estimation method according to claim 1, comprising:
   estimating a sound-source direction from the audio;
   calculating a sound-source score for each person from the estimated sound-source direction and a person detection direction in the image, the sound-source score indicating a probability of the speaker; and
   estimating the speaker from the calculated similarity and the sound-source score.

6. A speaker estimation device that estimates a speaker from audio and image, comprising:
   a processor including a memory and a control component;
   a microphone that receives audio; and
   a camera that receives an image of respective persons, the image not taken during speaking by the respective persons,
   the processor configured to perform:
   an image input controller function to control a position and an angle for inputting the image of the camera; and
   a control function to control the microphone, the camera, and the image input controller function,
   wherein the processor performs the control function to:
   extract a feature quantity comprising a first vector representing a voice characteristic from the audio input from the microphone;
   detect person regions of the respective persons from the image input from the camera;
   estimate a feature quantity comprising a second vector representing a voice characteristic from the respective detected person regions;
   control the image input controller function to perform a change such that an image taken from another position and with another angle is input when any person is not detected; calculate a similarity between the feature quantity representing the voice characteristic extracted from the input audio and the feature quantity representing the voice characteristic estimated from the person region in the image by comparing at least an L2 norm between the first vector and the second vector; and
   estimate a speaker from the calculated similarity.

7. The speaker estimation device according to claim 6,
   wherein the processor performs the control function to control the image input controller to change a position and an angle for inputting an image when the calculated similarity has a maximum value smaller than a threshold value.

8. The speaker estimation device according to claim 6, comprising an output device that outputs audio and a behavior,
   wherein the processor is further configured to perform the control function to control the output device to output the audio and the behavior for identifying the speaker when the calculated similarity has a maximum value smaller than a threshold value.

9. The speaker estimation device according to claim 8,
   wherein the processor is further configured to perform the control function to control the output device to output the audio and the behavior for identifying the speaker when the calculated similarity has two or more values equal to or more than the threshold value.

10. The speaker estimation device according claim 6,
    wherein the microphone includes a plurality of audio input units,
    the processor further configured to perform the control function to:
    estimate a sound-source direction from a plurality of pieces of audio input from the microphone;
    calculate a sound-source score for each person from the estimated sound-source direction and a person detection direction in the image, the sound-source score indicating a probability of the speaker; and
    estimate the speaker from the calculated similarity and the sound-source score.

* * * * *